United States Patent [19]
Schorsch

[11] 3,978,718
[45] Sept. 7, 1976

[54] ELECTRONIC DYNAMOMETER

[76] Inventor: Ronald W. Schorsch, 645 SW. 307th, Federal Way, Wash. 98002

[22] Filed: Mar. 31, 1975

[21] Appl. No.: 563,317

Related U.S. Application Data

[63] Continuation of Ser. No. 383,621, July 30, 1973, abandoned.

[52] U.S. Cl. .............................. 73/117.3; 73/136 R
[51] Int. Cl.² ........................................ G01L 5/13
[58] Field of Search ............. 73/116, 133 R, 136 R, 73/117.3

[56] References Cited
UNITED STATES PATENTS

| | | | |
|---|---|---|---|
| 3,175,394 | 3/1965 | Novas | 73/136 R |
| 3,201,982 | 8/1965 | Kennedy | 73/136 R |
| 3,686,941 | 8/1972 | Kramasz, Jr. et al. | 73/136 R X |

*Primary Examiner*—Jerry W. Myracle
*Attorney, Agent, or Firm*—Cole & Jensen

[57] ABSTRACT

Device for instant, continuing meter display of relative engine torque and tachometer output together with power indication. The engine torque and power readout derives from electro-mechanically coupling the engine to the dynamometer to sense the motion caused by the torque reaction of a motor or other torquing force. A motion sensor outputs a signal which can be made to read-out directly in torque on either a relative or absolute scale. Power indication is obtained by multiplying the tachometer and torque signals so that the resulting output is directly read-out in horsepower on either a relative or absolute scale.

11 Claims, 7 Drawing Figures

U.S. Patent  Sept. 7, 1976  3,978,718
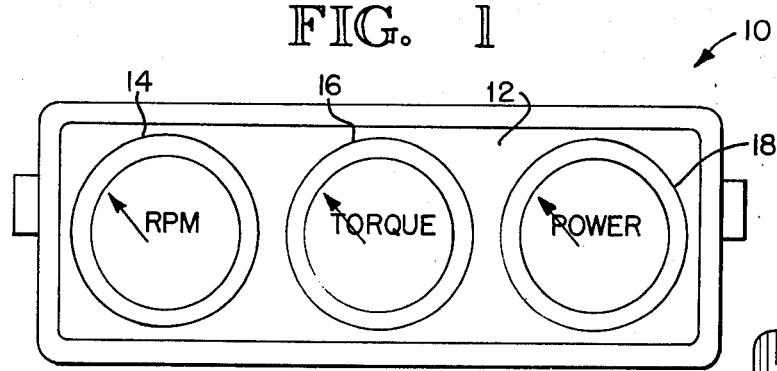
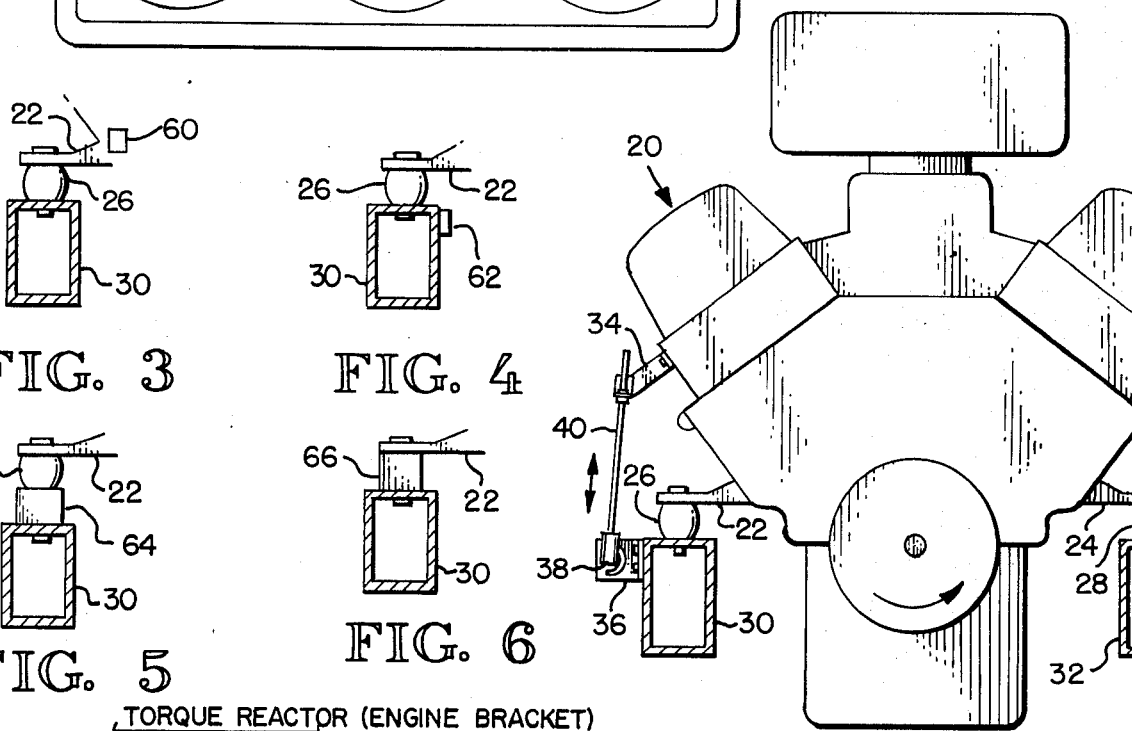
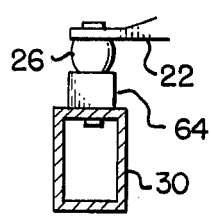
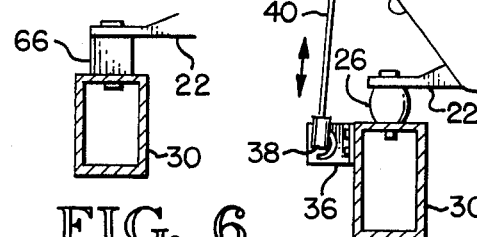
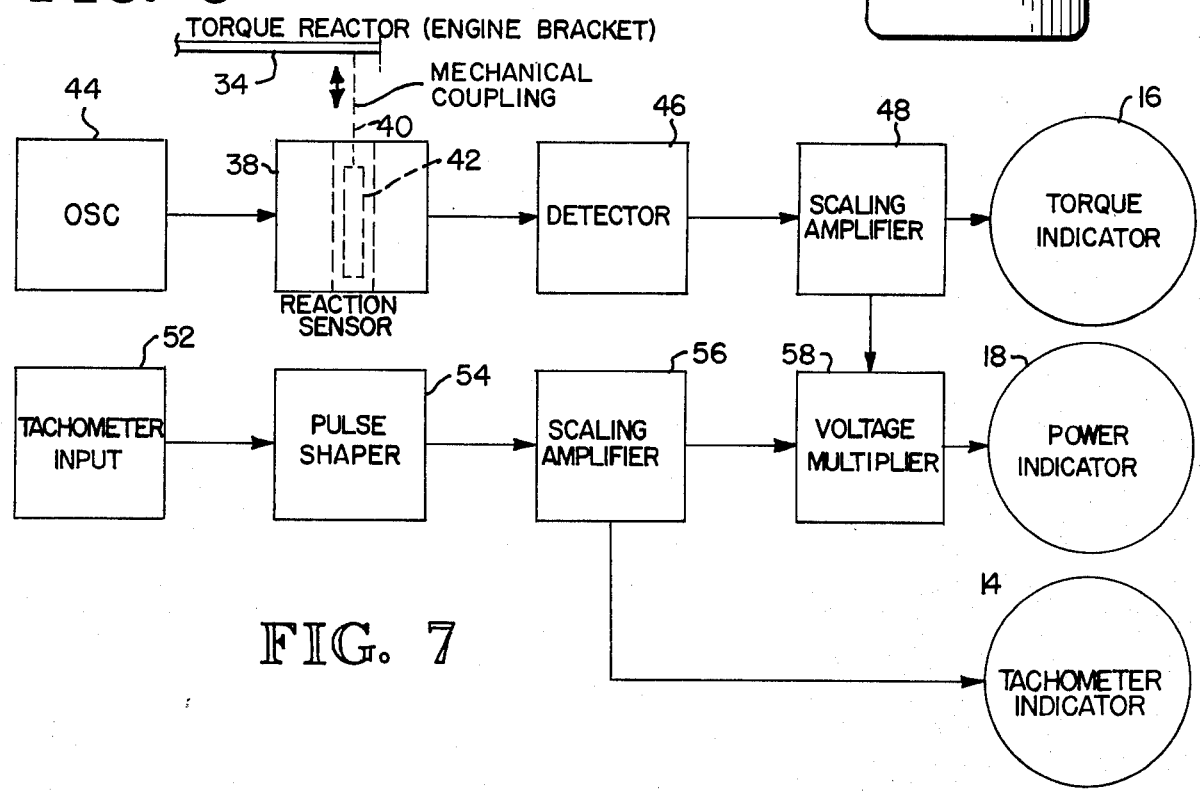

ELECTRONIC DYNAMOMETER

This is a continuation of application Ser. No. 383,621, filed July 30, 1973, now abandoned.

BACKGROUND OF THE INVENTION

The invention relates to a dynamometer device which shows engine power and torque outputs in either absolute horsepower and foot pound readings or on a relative scale and more particularly to a dynamometer which permits instant and full time read-out of the power and torque being developed by a power plant.

Those skilled in the art are aware that there has not been available on the market an economically feasible unit for instantaneous full time read-out of torque and power for vehicle, marine, aircraft and industrial engines, including but not limited to commercial fleets of trucks, tractor-trailer combinations and busses. Many operators are not able to have their engines running at peak efficiency much of the time with the resultant effect of incomplete combustion, low fuel mileage, engine degradation and air pollution.

The speed-torque curve of an engine varies with the many conditions which it operates under including temperature, humidity, altitude, barometric pressure, fuel quality, engine degradation, load and other conditions directly affecting engine performance. However, there is no economically feasible system available for giving an engine operator a full time, continuous read-out of torque and indication of power so that he can obtain peak engine efficiency under varying load, road and environmental conditions.

Among the prior art references considered to be of interest but not pertinent or relevant to the instant invention are U.S. Pat. Nos. 2,946,219; 3,164,986; 3,175,394; 3,190,113; and 3,640,131.

SUMMARY OF INVENTION

The invention comprises a system utilizing three meters, one of which is a tachometer for registering rpm, and the other two of which are engine torque and power output indicators. The system includes an electro-mechanical coupling means for sensing the torque reaction of an engine in its mounts such as a load cell, proximity detector, strain gauge or linear transducer. Upon sensing torque reaction of the engine the sensor generates a signal which is amplified and scaled to drive a torque meter which reads-out on either an absolute or a percentage scale. The tachometer input is amplified and scaled to provide rate of rotation to the tachometer indicator. The outputs from the torque amplifier and tachometer circuits are additionally applied to a circuit to generate a power reading on the power indicator, which reads-out on an absolute or on a percentage scale.

Accordingly, it is among the many features, objects and advantages of this invention to provide a small dynamometer for all types of engines which for the first time permits instant, full time read-out of the torque and power output of an engine. The system can be installed or connected rapidly. The console containing the three meters may be permanently mounted in the instrument panel or it may be used as a portable test unit. In either case the engine can be tuned for peak power and efficiency under actual operating speed and load conditions. It will accurately measure engine speed, torque and power performance curves. It may be connected to an electrical recorder for plotting the speed-torque and speed-power curves. Such a system with solid state, integrated circuitry allows long life and is essentially maintenance free. The device enables automatic transmission slippage to be measured under operating conditions and it can be used to tune marine engines under actual load conditions either at the dock or while under way. In the marine field it can be used to test efficiency of hull and propeller designs. It may be used to test aircraft prop designs and as an instrument for adjusting throttles on light aircraft to insure maximum rate of climb and load ability. It may be used to adjust constant speed/constant torque props. This device can verify that an engine or transmission meets the manufacturer's torque and power specifications. The system is bi-directional, that is, it will read-out engine accelerating and braking torque and power. Because the system gives constant monitoring of engine performance it enables the vehicle operator to run the vehicle more efficiently and therefore to cut fuel consumption. With more complete fuel combustion there is less pollution and reduced engine wear. Finally, installation is quite simple and easy and often can be done within minutes.

BRIEF DESCRIPTION OF DRAWINGS

FIG. 1 shows for illustrative purposes a front elevation of the console face with the three meter indicators plainly visible to the eye;

FIG. 2 is a front end diagramatic elevation view showing the preferred type of electro-mechanical coupling of an engine to the sensing device for detecting the torque reaction of the engine;

FIG. 3 shows how a strain gauge may be located with respect to an engine mount in order to detect torque reaction;

FIG. 4 shows how a strain gauge may be located on a frame structure near an engine mount in order to detect torque reaction of the engine;

FIG. 5 shows a load cell installed between an engine mount and the supporting frame;

FIG. 6 shows the load cell used in place of the mounting grommet; and

FIG. 7 is a block diagramatic view of the important circuit components of the system.

DESCRIPTION OF PREFERRED EMBODIMENTS

FIG. 1 shows, at approximately half scale, how the vehicle cab type console unit 10 appears to the operator. It includes console face 12, tachometer indicator 14, torque indicator 16 and power indicator 18. As stated above, both the meters 16 and 18 read-out in absolute or a percentage indication of torque and full power.

FIG. 2 shows engine 20 having engine mounting brackets 22 and 24 supported on conventional mounting grommets 26 and 28 which in turn are supported on the chassis frame members 30 and 32. Only two engine mounts are shown for purposes of illustration, since those skilled in the art will appreciate that there will normally be additional engine mounts. The preferred manner of sensing the torque reaction of engine 20 includes a bracket 34 attached to an existing stud or threaded hole on the engine. A second bracket 36 is mounted on the frame and supports the reaction sensor 38. Reaction sensor 38 in this embodiment is a torque or displacement means sensitive to the movement, bending or displacement of the engine. Preferrably it is a linear, variable, differential transformer or LVDT. A mechanical coupling arm or rod 40 is adjustably supported at one end on bracket 34 while the other end of rod 40 includes the electrical coupling device in this case ferrite slug or core 42. When the engine reacts to the torque output there is certain amount of displacement on the mountings. Transducer 38 directly translates the motion of the engine into an output voltage which is linearly proportional to the distance moved by core 42. Because in the preferred embodiment an LVDT is used, it will be appreciated by reference to FIG. 7 that the transducer 38 must have an excitation signal for its field. Accordingly, an oscillator 44 is provided which outputs an A.C. excitation signal so that as core 42 moves the electrical coupling between windings in the transducer changes.

Detector 46 converts the A. C. signal to D. C. and amplifies and integrates the signal. It will be understood that detector circuit 46 normally is a full wave or absolute value detector but could be a phase detector. However, phase detection would require a "zero center scale" read-out with a plus and minus scale. With full wave or absolute value detection all indications are up scale which allows a better visual read-out when used with an analogue meter movement. The integrator portion of the detector 46 smooths out operation of the torque meter movement.

A scaling amplifier 48 amplifies the detected signal from circuit 46 to a level at which torque meter 16 can be driven. As those skilled in the art will appreciate the incoming signal from the circuit 46 is boosted to a level where other noise signals do not affect accurate driving of meter 16. It will also be appreciated that torque indicator 16 can be a linear, digital or analogue indicator.

The tachometer input component 52 may be any one of a number of standard tachometer input devices such as a diesel tach sender, magnetic coupling tooth counter, proximity switches, capacitive detectors or photo cell. For gasoline engines the signal for tachometer input is taken from the engine distributor and ignition. The input signal from the tachometer input 52 is an electrical signal. The amplitude can vary from as little as 0.5 volts to as much as 500 volts.

The signal from input 52 fires a pulse shaper 54 which is a precision pulse width one-shot component in the present embodiment. The pulse shaper outputs an essentially square shaped wave of precisely determined width. Magnitude of the output wave may fluctuate but its width must be uniform. The circuit is designed so that amplitudes of the output wave do not affect accuracy of the system, but rather it is the pulse width which in the instant device is relied upon for accuracy. While this embodiment shows a pulse width tach system other conventional tach circuits could be utilized. This network at any rate is for the purpose of detecting and wave scaling whether it be width, amplitude or both.

The output signal from pulse shaper 54 is sent to scaling amplifier 56 which as described above scales the signal to a level which will drive the tachometer 14. Scaling amplifier 56 integrates the signal and outputs a D. C. signal to tachometer 14 but sends a square wave pulse to a voltage multiplier circuit 58. The multiplier circuit 58 also receives a signal from torque scaling amplifier 48, and multiplies it by the tach signal. The resulting signal is integrated to provide a D. C. signal and scaled for driving power indicator 18. While the present embodiment utilizes a pulse width/pulse amplitude multiplier, the function could be performed by any conventional multiplier circuit.

FIGS. 3 through 6 show alternative embodiments by which the engine displacement or torque reaction may be sensed. A strain gauge 60 may be located on or near the engine mounting arm 22 in such a way as to be sensitive to reaction oriented engine torque forces so as to output a signal. Likewise, in FIG. 4 the strain gauge 62 may be located on the frame itself since there will be some flexing or bending of the frame in proportion to the torque reaction of the engine transmitted through engine mount arm 22 and mounting grommet 26. In FIG. 5 a load cell 64 is shown to be disposed between mounting grommet 26 and frame 30. In FIG. 6 load cell 66 is shown to be substituted for grommet 26 between mounting arm 22 and frame 30. If the sensor employs D. C. then obviously, oscillator 44 and detector 46 could for all practical purposes be eliminated. However, use of strain gauges and load cells complicates the problem of installation and therefore the transducer coupling illustrated in FIGS. 2 and 7 is preferred for its simplicity.

Some engines will deflect more in their mountings than others. This is due to differing engine torques and engine mounts of varying rigidity. Thus it is necessary to adjust gain in the scaling amplifier 48 depending upon the amount of motion or reaction movement from the engine. In the instant invention gain can be calibrated at the time of installation or connection by adjusting scaling amplifier 48. Because some engines are fixed in place it is necessary to read-out full scale torque from very minute deflections. The present system embodies a gain range allowing full scale torque output with deflections in the range 0.0006 to 0.250 inch of torsional reaction. This range could be reduced to micro inches on the low side to several full inches on the high side if necessary.

What is claimed is:

1. Electronic engine dynamometer system for engine analysis wherein as an engine having support mounts and a support frame is operated into a load, a reaction force is generated causing displacement of the engine with respect to its mounts and support frame which is proportional to the torque output of the engine, said system comprising:
   a. reaction responsive means for reacting to the displacement of said engine,
   b. electronic reaction sensing means operatively connected to said reaction responsive means for electronically sensing the amount of motion caused by the torque reaction of the engine and producing a signal proportion to said amount of motion,
   c. electronic torque indicator means operatively connected to said sensing means for instant, continuing visual readout of the torque output of said engine,
   d. an electronic detector circuit for receiving and converting A. C. signals from said reaction sensing means to D. C. signals is disposed between said reaction sensing means and said torque indicator,
   e. electronic tachometer input means for measuring the rotational speed of said engine in rpm,
   f. electronic tachometer indicator operatively connected to said tachometer input means for instant continuing visual readout of the rpm of said engine,
   g. electronic multiplier circuit means for receiving signals from said reaction sensing means and from said tachometer input means for conversion of said signals to power output, and h. electronic power indicator operatively connected to said multiplier circuit means for instant, continuing visual readout of the power output of said engine.

2. The electronic dynamometer system according to claim 1 in which said reaction sensing means is a linear variable, differential transformer means.

3. The electronic dynamometer system of claim 2 and in which said reaction sensing means is supported on one of either said engine or said support frame.

4. The electronic dynamometer system of claim 3 and in which said reaction responsive means is a mechanical coupling at least a portion of which is attached to the other of either said engine or said support frame and another portion of which is operatively connected to said reaction sensing means.

5. The electronic dynamometer according to claim 4 and in which a scaling amplifier is disposed between said detector circuit and said torque indicator for amplifying signals to properly actuate said torque indicator.

6. The electronic dynamometer according to claim 5 and wherein a tachometer scaling component is disposed between said tachometer input means and said multiplier circuit for accurately scaling of signal from said tachometer input means.

7. The electronic dynamometer according to claim 6 and wherein a scaling amplifier is disposed between said tachometer scaling component and said multiplier circuit and to said tachometer indicator.

8. The electronic dynamometer according to claim 7 and in which said tachometer scaling component is a precision pulse width one-shot component.

9. The electronic dynamometer system according to claim 1 and in which said reaction sensing means is a strain gauge.

10. The electronic dynamometer system according to claim 1 and in which said reaction sensing means is a load cell.

11. The electronic dynamometer according to claim 1 and in which said reaction sensing means is a linear transducer.

* * * * *